US012454361B1

(12) United States Patent
Salois et al.

(10) Patent No.: US 12,454,361 B1
(45) Date of Patent: Oct. 28, 2025

(54) ELECTRONICALLY ACTUATED ROCKET CATAPULT SYSTEM FOR EJECTION SEATS

(71) Applicant: Goodrich Corporation, Charlotte, NC (US)

(72) Inventors: Matthew Salois, Fairfield, CA (US); Kevin J Mueller, Davis, CA (US); Luis G. Interiano, Galt, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/751,684

(22) Filed: Jun. 24, 2024

(51) Int. Cl.
B64D 25/10 (2006.01)

(52) U.S. Cl.
CPC .................................. B64D 25/10 (2013.01)

(58) Field of Classification Search
CPC .. B64D 25/10; B64D 11/0616; B64D 11/0689
See application file for complete search history.

(56) References Cited

U.S. PATENT DOCUMENTS

| 3,802,651 | A |   | 4/1974 | Axenborg et al. | |
|---|---|---|---|---|---|
| 3,861,625 | A | * | 1/1975 | Sadler | B64D 25/10 244/122 AD |
| 3,979,088 | A | * | 9/1976 | McCormick | B64D 25/10 244/122 AD |
| 4,017,040 | A | * | 4/1977 | Dillinger | F42B 10/663 102/504 |
| 4,236,687 | A | * | 12/1980 | Stone | B64D 25/10 244/177 |
| 4,613,100 | A | * | 9/1986 | Martin | B64D 25/10 244/122 AD |
| 4,667,903 | A | * | 5/1987 | Herndone | B64D 25/10 244/122 A |

(Continued)

FOREIGN PATENT DOCUMENTS

| CN | 114537680 A | 5/2022 |
|---|---|---|
| RU | 2119878 C1 | 10/1998 |

OTHER PUBLICATIONS

"Ejection Seat Propulsion and Stability." Website: <www.ejectionsite.com/bangwhoosh/prostab.htm>. Retrieved from Wayback Machine archive created on May 22, 2024. (Year: 2024).*

Primary Examiner — Joshua J Michener
Assistant Examiner — Michael B. Kreiner
(74) Attorney, Agent, or Firm — CANTOR COLBURN LLP (57) ABSTRACT

Ejection seat systems include an ejection seat and a propellant assembly mounted to the ejection seat. A nozzle assembly having an adjustable nozzle is moveably attached to the ejection seat and configured to receive propellant exhaust from the propellant assembly and exhaust through the adjustable nozzle. A first linear electric actuator is operably connected to the adjustable nozzle and arranged to adjust an orientation of the adjustable nozzle in a first direction and a second linear electric actuator is operably connected to the adjustable nozzle and arranged to adjust an orientation of the adjustable nozzle in a second direction. The second direction includes a directional component that is normal to the first direction. A control module is configured to control operation of the first linear electric actuator and the second linear electric actuator.

20 Claims, 7 Drawing Sheets

(56) References Cited

U.S. PATENT DOCUMENTS

| | | | | |
|---|---|---|---|---|
| 4,749,154 A * | 6/1988 | Herndon | ............... | B64D 25/10 |
| | | | | 244/122 AB |
| 5,131,608 A * | 7/1992 | Ash | ................... | B64D 11/0616 |
| | | | | 244/122 AG |
| 6,591,602 B1 * | 7/2003 | Ruff | ...................... | B64D 25/10 |
| | | | | 60/229 |
| 7,578,472 B2 * | 8/2009 | Mastrolia | ............... | B64D 25/10 |
| | | | | 60/228 |
| 10,344,712 B2 | 7/2019 | Ruff | | |
| 11,300,078 B2 | 4/2022 | Benjamin et al. | | |
| 11,319,078 B2 * | 5/2022 | Mastrolia | ............... | B64D 25/10 |
| 11,338,924 B2 * | 5/2022 | Mastrolia | ............... | B64D 25/10 |
| 11,884,408 B2 * | 1/2024 | Wilson | ...................... | F02K 9/12 |

* cited by examiner

ELECTRONICALLY ACTUATED ROCKET CATAPULT SYSTEM FOR EJECTION SEATS

BACKGROUND

The subject matter disclosed herein generally relates to ejection seat systems and, more particularly, to electronically actuated rocket catapult systems for ejection seats.

Aircraft may be equipped with ejection seat systems for ejecting a pilot or occupant (user) from the aircraft upon activation of the ejection system. For example, during ejection events, an ejection seat may be propelled from an aircraft cockpit in an upward direction from the body of the aircraft. Ejection systems are designed to expel pilots from the aircraft cockpit and to reduce risks of injury to the user during the ejection event. Ejection seats in high performance aircraft benefit from safely removing the pilot or other occupant from the aircraft across a wide variety of aircraft speed regimes, altitudes, and aircraft attitudes. Occupants of aircraft may be various weights ranging from a relatively light weight individual to a relatively heavy individual, which may prevent a single amount of force of thrust to propel an occupant out an aircraft from being desirable.

Furthermore, current ejection seat systems may include a trajectory divergence rocket motor (TDRM) that purposefully induces a roll into the seat during the ejection. Such a system is employed to create space between multiple seats during a dual ejection event and/or to create space between an ejected seat (and user) and the aircraft from which the seat is ejected. In either situation, the use of the TDRM provides clearance between the two seats and/or between the seat and the aircraft during the ejection event. During the operation to provide the clearance, the TDRM will not only push the seat sideways and away from the other seat and/or aircraft, but it will also induce a roll to the seat (i.e., not just lateral motion). It is not desirable to induce a roll into the seat during ejection without a means for correcting the roll. Currently there is no active way to correct the roll the TDRM introduces into the seat. Although a vernier motor may be employed to assist in pitch correction of the seat during the ejection event and a rocket catapult motor to eject and provide clearance between the seat(s) and/or aircraft. These three motors together (vernier motor, TDRM, and rocket catapult motor) provide for relatively safe ejection operations. However, improvements to such systems may be achieved to reduce roll and/or correct for induced roll, thus reducing risks associated with improper or undesirable orientation of the seat/user during deployment of a parachute.

SUMMARY

According to some embodiments, ejection seat systems are provided. The ejection seat systems include an ejection seat, a propellant assembly mounted to the ejection seat, and a nozzle assembly having an adjustable nozzle moveably attached to the ejection seat and configured to receive propellant exhaust from the propellant assembly and exhaust through the adjustable nozzle. A first linear electric actuator is operably connected to the adjustable nozzle and arranged to adjust an orientation of the adjustable nozzle in a first direction and a second linear electric actuator is operably connected to the adjustable nozzle and arranged to adjust an orientation of the adjustable nozzle in a second direction, with the second direction having a directional component that is normal to the first direction. A control module is configured to control operation of the first linear electric actuator and the second linear electric actuator.

In addition to one or more of the features described herein, or as an alternative, further embodiments of the ejection seat systems may include at least one sensor arranged on the ejection seat and configured to detect a directional orientation of the ejection seat, wherein the at least one sensor is operably connected to the control module.

In addition to one or more of the features described herein, or as an alternative, further embodiments of the ejection seat systems may include that the control module comprises a controller and at least one sensor configured to detect a directional orientation of the ejection seat, wherein the at least one sensor is operably connected to the controller.

In addition to one or more of the features described herein, or as an alternative, further embodiments of the ejection seat systems may include a power source configured to supply electrical power to each of the first linear electric actuator and the second linear electric actuator.

In addition to one or more of the features described herein, or as an alternative, further embodiments of the ejection seat systems may include that the power source is a battery installed within the ejection seat.

In addition to one or more of the features described herein, or as an alternative, further embodiments of the ejection seat systems may include that the power source is configured to supply power to the control module.

In addition to one or more of the features described herein, or as an alternative, further embodiments of the ejection seat systems may include that the propellant assembly includes a cartridge housing configured to be attached to the ejection seat and a propellant cartridge installed within the cartridge housing.

In addition to one or more of the features described herein, or as an alternative, further embodiments of the ejection seat systems may include that the nozzle assembly is configured to removably attach to the cartridge housing at a first end of the cartridge housing.

In addition to one or more of the features described herein, or as an alternative, further embodiments of the ejection seat systems may include that the propellant assembly further comprises a cartridge cap removably attachable to a second end of the cartridge housing.

In addition to one or more of the features described herein, or as an alternative, further embodiments of the ejection seat systems may include that the propellant cartridge comprises a solid propellant.

In addition to one or more of the features described herein, or as an alternative, further embodiments of the ejection seat systems may include a breach configured to releasably connect the ejection seat to an aircraft.

In addition to one or more of the features described herein, or as an alternative, further embodiments of the ejection seat systems may include that the adjustable nozzle is a first adjustable nozzle and the nozzle assembly comprises a second adjustable nozzle.

In addition to one or more of the features described herein, or as an alternative, further embodiments of the ejection seat systems may include a second first linear electric actuator operably connected to the second adjustable nozzle and a second second linear electric actuator operably connected to the second adjustable nozzle.

In addition to one or more of the features described herein, or as an alternative, further embodiments of the ejection seat systems may include that the control module is configured to perform thrust vectoring based on input received from at least one sensor.

According to some embodiments, methods of ejecting an ejection seat from an aircraft are provided. The methods include initiating an ejection operation in response to an ejection operation input, igniting a propellant of a propellant assembly that is mounted to an ejection seat, directing propellant exhaust through a nozzle assembly that is operably connected to the propellant assembly, wherein the nozzle assembly comprises an adjustable nozzle, monitoring an orientation of the ejection seat using at least one sensor and a control module, and controlling, using the control module, operation of a first linear electric actuator and a second linear electric actuator to adjust a direction of the adjustable nozzle in response to the monitored orientation of the ejection seat, wherein the first linear electric actuator is arranged to adjust an orientation of the adjustable nozzle in a first direction and the second linear electric actuator is arranged to adjust an orientation of the adjustable nozzle in a second direction, wherein the second direction comprises a directional component that is normal to the first direction.

In addition to one or more of the features described herein, or as an alternative, further embodiments of the methods may include that the control module and at least one sensor are configured to monitor for a roll of the ejection seat and to adjust the orientation of at least one of the first linear electric actuator and the second linear electric actuator to correct for a detected roll.

In addition to one or more of the features described herein, or as an alternative, further embodiments of the methods may include supplying electrical power from a power source mounted on the ejection seat to each of the first linear electric actuator and the second linear electric actuator.

In addition to one or more of the features described herein, or as an alternative, further embodiments of the methods may include that the control module is configured with a pre-programmed thrust vectoring operation to be performed in response to the initiation of the ejection operation.

In addition to one or more of the features described herein, or as an alternative, further embodiments of the methods may include that the control module is configured to adjust the pre-programmed thrust vectoring operation in response to input received from the at least one sensor by controlling actuation of the first linear electric actuator and the second linear electric actuator.

In addition to one or more of the features described herein, or as an alternative, further embodiments of the methods may include that the adjustable nozzle is a first adjustable nozzle and the nozzle assembly comprises a second adjustable nozzle, the method further includes controlling, with the control module, thrust vectoring of each of the first adjustable nozzle and the second adjustable nozzle.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Variable thrust and directional adjustment rocket catapult systems for use in aircraft ejection systems are described herein. The rocket catapult systems of the present disclosure include a cartridge configured to supply a fuel to a nozzle assembly having actuatable nozzles. The rocket catapult systems of the present disclosure provide directional adjustment of a rocket force applied to an ejection seat, to thereby control movement of the ejection seat relative to an aircraft from which the seat is ejected and/or relative to another seat that is ejected from the aircraft.

Figure 1:
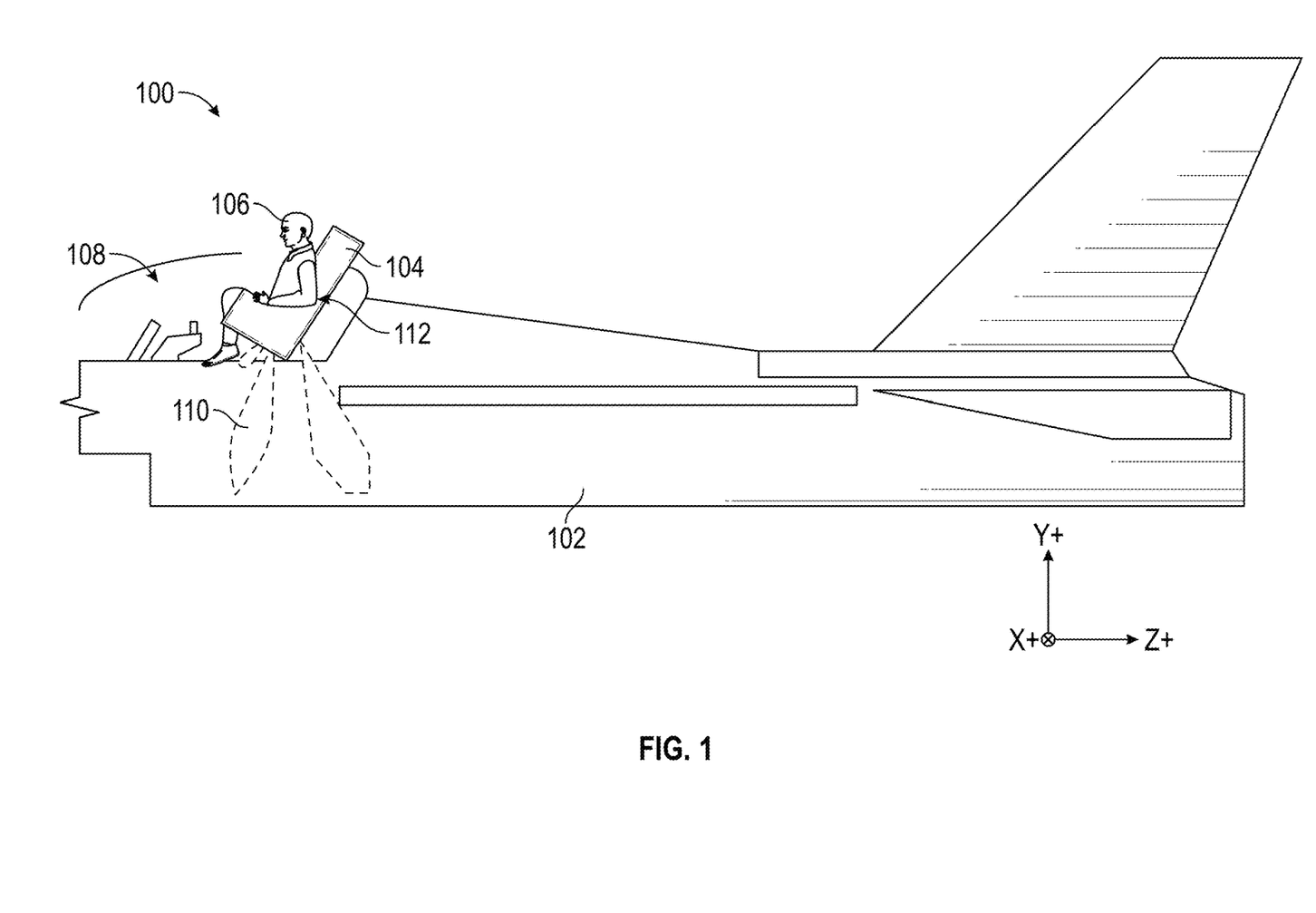
FIG. 1 is a schematic illustration of an aircraft that may incorporate embodiments of the present disclosure.

Referring to FIG. 1, an aircraft ejection system 100 that installed on an aircraft 102 in accordance with various embodiments of the present disclosure is shown. The aircraft ejection system 100 is configured to expel an ejection seat 104 and an occupant 106 (e.g., pilot, crewmember, etc.) of ejection seat 104 from a cockpit 108 of aircraft 102. The ejection seat 104 may be urged from the cockpit 108 by a propulsion system 110. In accordance with various embodiments, the ejection seat 104 includes a rocket catapult assembly 112. The rocket catapult assembly 112 may include one or more elements of the propulsion system 110 and may be configured to eject the ejection seat 104 and the occupant 106 from the cockpit 108.

The rocket catapult assembly 112 is configured to force the ejection seat 104 out of the aircraft 102 in a manner that is intended to avoid collision between the ejection seat 104 and/or occupant 106 and a part of the aircraft 102 and/or between the ejection seat 104 and/or occupant 106 and another ejection seat/occupant if two (or more) are provided within the aircraft 102. Accordingly, the rocket catapult assembly 112 may include components to generate a positive +Y-direction force (upward and away from the aircraft 102). The rocket catapult assembly 112 may also include one or more mechanisms to move the ejection seat 104 in a positive (+) X-direction or a negative (−) X-direction (e.g., a lateral direction relative to a direction of flight of the aircraft 102). The X-direction is a direction into and out of the page of FIG. 1 and such directional movement may be provided to avoid contact with a tail of the aircraft 102 or with another ejected seat from the aircraft 102.

Figure 2A:
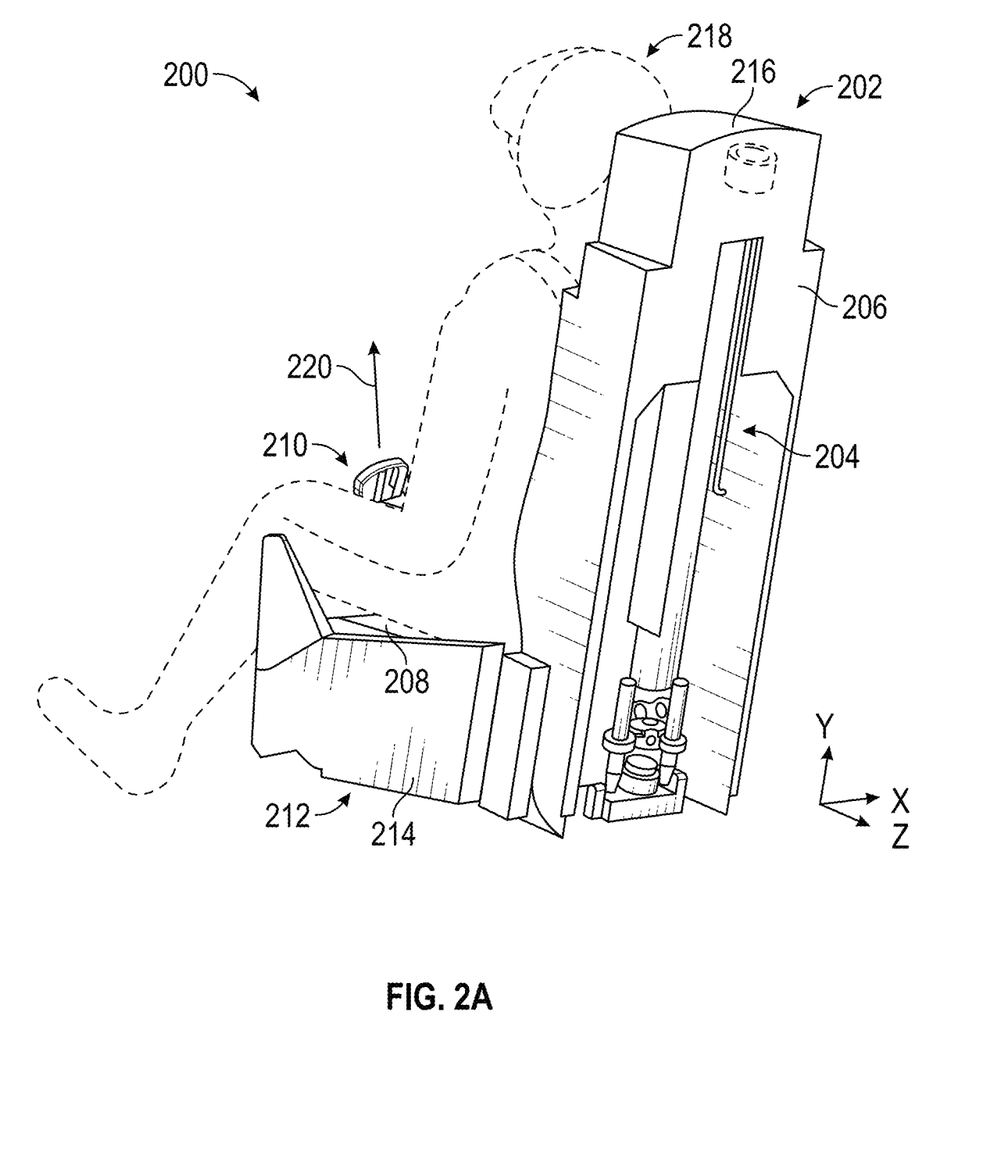
FIG. 2A is a schematic illustration of an ejection seat system that may incorporate embodiments of the present disclosure.
Figure 2B:
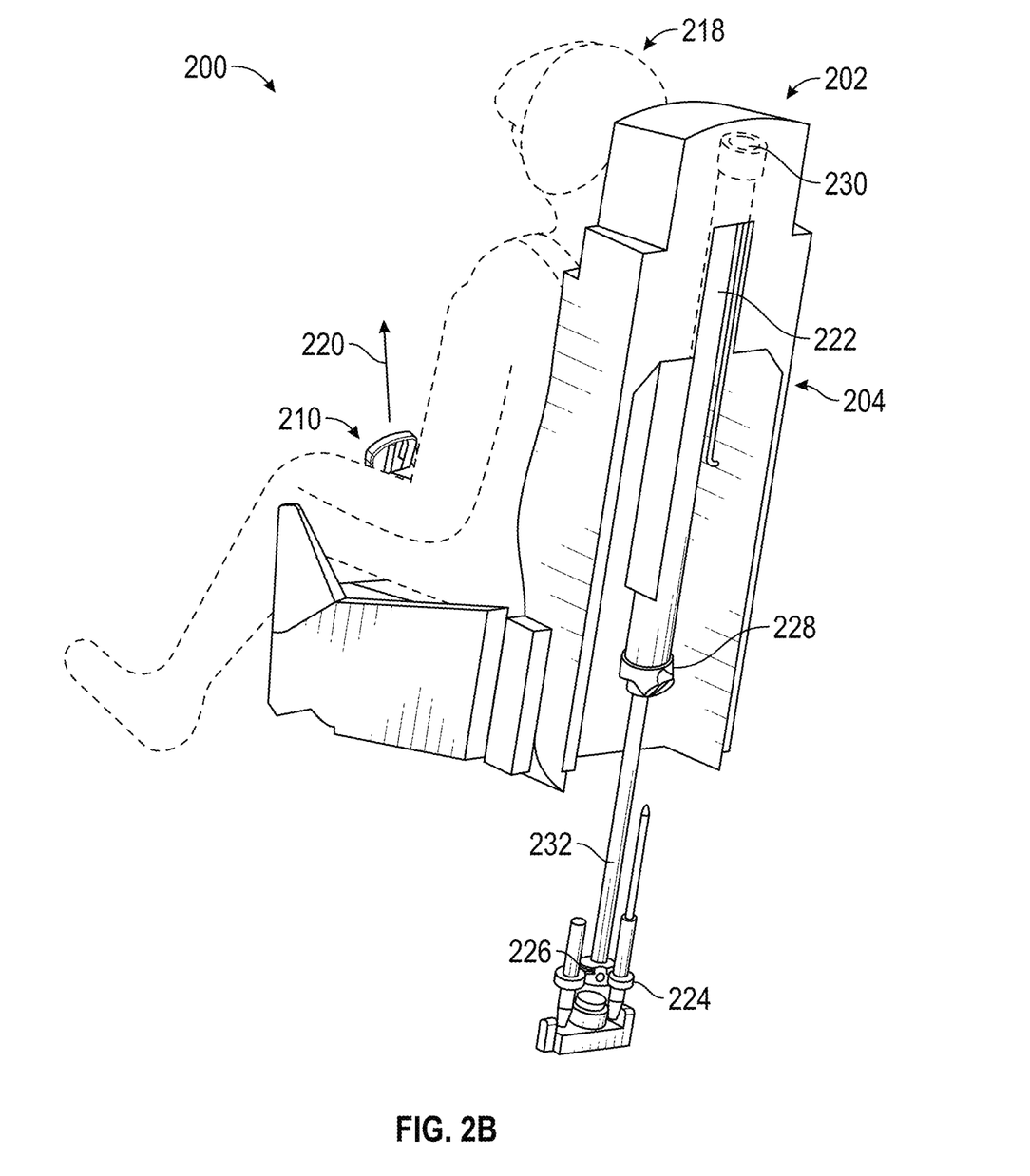
FIG. 2B is a schematic illustration of the ejection seat system of FIG. 2A during an ejection operation.

Referring to FIGS. 2A-2B, schematic illustrations of operation of an ejection seat system 200 that may incorporate embodiments of the present disclosure are shown. The ejection seat system 200 may be installed on an aircraft, and may be configured to operate similar to that shown and described with respect to FIG. 1. FIG. 2A illustrates the ejection seat system 200 in the unactuated state, and FIG. 2B illustrates the ejection seat system 200 during an initial state of operation or deployment.

For example, FIG. 2A illustrates the ejection seat system 200 having an ejection seat 202 that is illustrated with a rocket catapult assembly 204 in an inactive state. The ejection seat 202 includes a seat back 206 and a seat pan 208. The rocket catapult assembly 204 is coupled to the seat back 206. In various embodiments, an ejection handle 210 may be located proximate a seat bucket 212 of the seat pan 208. The seat bucket 212 of the seat pan 208 is generally opposite, or distal, the seat back 206. While FIGS. 2A-2B illustrate the ejection handle 210 located at the seat bucket 212 of the seat pan 208, it will be appreciated that an ejection handle may be located anywhere that is accessible to an occupant of the ejection seat 202. For example, an ejection handle may be located in, on, or adjacent to a side 214 of the seat pan 208 or may be located in, on, or adjacent a headrest 216 of the ejection seat 202. To initiate an ejection operation, an occupant 218 (e.g., pilot, crewmember, or other user) may pull or otherwise actuate the ejection handle 210. In this illustrative configuration, the ejection handle 210 may be pulled upward as indicated by arrow 220.

As shown in FIG. 2B, the ejection seat 202 is illustrated with the rocket catapult assembly 204 in an active state. The ejection handle 210 may be configured to initiate an ejection sequence upon actuation. For example, the occupant 218 may pull the ejection handle 210 in the direction of arrow 220 which may activate the rocket catapult assembly 204. The rocket catapult assembly 204, in this configuration, includes a mortar assembly 222, a breach 224, a catapult cartridge unit 226, a nozzle assembly 228, and a mortar cap assembly 230. In response to activation at the ejection handle 210, the catapult cartridge unit 226 may ignite and tend to produce relatively hot, high pressure, gas. The breach 224 may be coupled to an aircraft, with a mortar tube 232 disposed within the mortar assembly 222. In various embodiments, the mortar cap assembly 230 may direct a first portion of gas to the breach 224, tending thereby to drive the mortar tube 232 outward of the mortar assembly 222 and cause the ejection seat 202 to be expelled from a cockpit or other part of an aircraft. In various embodiments, the mortar tube 232 may separate from the mortar assembly 222 in response to the ejection seat 202 departing from the aircraft. In various embodiments, the breach 224 may include an integral gas generator which, in response to activation, may drive the mortar tube 232 outward of the mortar assembly 222 and cause the ejection seat 202 to be expelled from the aircraft. In various embodiments, the mortar assembly 222 may be ignited in response to the mortar tube 232 exiting the mortar assembly 222.

Once ejected from the aircraft, if configured with a conventional ejection seat system, the nozzle assembly 228 will receive fuel from the mortar assembly 222 to generate a motive force and propel the ejection seat 202 away from the aircraft from which it was ejected. The nozzle assembly 228 may be oriented to apply a sideways force (positive or negative X direction) to ensure that the ejection seat 202 is moved to a position that is out of the way of the aircraft from which it was ejected and/or out of the way of another ejection seat. In the case of a two-seat configuration, one ejection seat may be configured with a left orientation and the other ejection seat may be configured with a right orientation, such that the two seats are ejected away from each other and away from the aircraft. Using a conventional system, a roll may be induced to the ejection seat 202 as it is propelled away from the aircraft and moved to the side. Although the ejection seat 202 may be pushed sideways and away from the aircraft (and/or other ejection seat), a roll of the ejection seat 202 may be induced by the force expelled from the nozzle assembly 228.

It is not desirable to induce a roll into the ejection seat 202 during ejection without a means for correcting the roll. However, the conventional systems do not include active mechanisms to correct the roll that is introduced into the movement of the ejection seat 202 as it is ejected from an aircraft. Roll may also be induced by other mechanisms, such as air currents, forces applied by a parachute during the ejection operation, or the like. In additional to not having mechanisms for correcting for roll, conventional systems do not include mechanisms to prevent the roll in the first place. Although a vernier motor may be employed to assist in pitch correction of the seat during the ejection event and a rocket catapult motor to eject and provide clearance between the seat(s) and/or aircraft. These three motors together (vernier motor, TDRM, and rocket catapult motor) provide for a relatively safe ejection operation. However, improvements to such systems may be achieved to reduce roll and/or correct for induced roll, thus reducing risks associated with improper or undesirable orientation of the seat/user during deployment of a parachute.

Accordingly, the nozzle assembly 228 may be configured with one or more adjustable nozzles for controlling a direction of exhaust expelled therefrom, as described herein. As the adjustable nozzle(s) are adjusted in orientation, the direction of force, and thus motion, of the ejection seat 202 may be controlled. Further, because the adjustable nozzle(s) may be controllable for multiple degrees of freedom, the ejection path may be controlled as the ejection seat 202 exits an aircraft and also control after ejection may be achieved to correct an induced roll to ensure proper orientation of the ejection seat 202 and/or such a roll may be avoided.

In view of the above and other considerations, and in accordance with some embodiments of the present disclosure, ejection seat systems are provided with thrust vectoring capability. In accordance with some non-limiting embodiments, thrust vectoring may be accomplished using two or more electromechanical linear actuators to provide multi-axis nozzle movement (e.g., two-axis). In some embodiments, multiple nozzles may be provided to achieve three dimensions of directional force application and thus correct and/or reduce the introduction of roll during an ejection operation. In accordance with some embodiments, a logic controller may be provided to control operation of the electromechanical linear actuators during the ejection operation. The logic for nozzle movement may be incorporated or stored on the logic controller which may be provided in a control box or otherwise integrated into the control system of the ejection seat systems. In accordance with some embodiments, power may be supplied from one or more batteries or other power source provide within the ejection seat system. In accordance with some embodiments, the ejection mechanism (e.g., catapult) may be separated into two components, such as a replaceable part that contains all the propellants/fuel for operation and a nozzle assembly with a breach that is configured to stay installed on the seat. During an ejection operation, the nozzle on the ejection seat system may be actuated forward and aft to control pitch and then it would be capable to push the seat sideways for dual seat clearance or to avoid other objects (e.g., part of an aircraft). The nozzle(s) may then be directionally actuated to offset the roll that may be induced by the sideways clearance operation.

Figure 3:
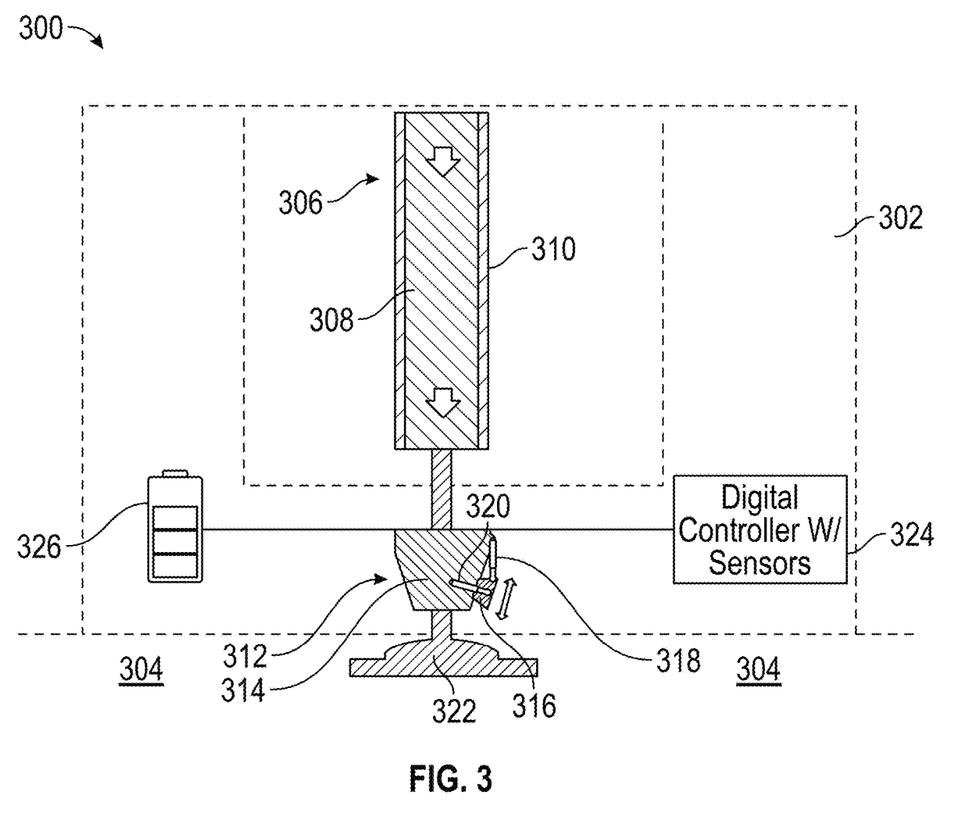
FIG. 3 is a schematic illustration of an ejection seat system in accordance with an embodiment of the present disclosure.

Referring now to FIG. 3, a schematic illustration of an ejection seat system 300 in accordance with an embodiment of the present disclosure is shown. The ejection seat system 300 includes an ejection seat 302 that is mounted within an aircraft 304. The ejection seat system 300 may be similar to that shown and described above, being configured to perform an ejection operation to eject the ejection seat 302 from the aircraft 304.

The ejection seat system 300 of this embodiment, includes a propellant assembly 306 that is removably arranged within the ejection seat 302. The propellant assembly 306 includes a propellant cartridge 308 housed within a cartridge housing 310. When the propellant cartridge 308 is activated during an ejection operation, propellant hot exhaust will be ejected through a nozzle assembly 312. The nozzle assembly 312 a nozzle housing 314, an adjustable nozzle 316, a first linear electric actuator 318, and a second linear electric actuator 320. The nozzle assembly 312 is attached to or otherwise connected to the ejection seat 302 and is removably attached to the aircraft 304 at a breach assembly 322. The breach assembly 322 is configured to be separated upon initiation of an ejection operation and the ejection seat 302 will be ejected from the aircraft 304 as the propellant hot exhaust from the propellant cartridge 308 is directionally expelled through the adjustable nozzle 316 of the nozzle assembly 312.

A control module 324 is provided to control the operation of the nozzle assembly 312. The control module 324 may include various electronic control elements, such as memory, processors, input and output elements, and the like, as will be appreciated by those of skill in the art. The control module 324 may further include one or more sensors that are configured to detect orientation of the ejection seat 302. The detection of orientation may be made relative to a fixed direction (e.g., gravity) or may be made as a measurement of change in direction relative to a prior state. As such, in some embodiments, the control module 324 may be configured to monitor an orientation of the ejection seat 302 and provide commands to or otherwise control operation of the first and second linear electric actuators 318, 320 to provide directional force application to adjust a direction of travel and orientation of the ejection seat 302 during an ejection operation.

The ejection seat system 300 further includes a power source 326. The power source 326 is operably connected to the nozzle assembly 312 and is configured to supply electrical power to, at least, the first and second linear electric actuators 318, 320. In response to input or commands received from the control module 324, the linear electric actuators 318, 320 may be actuated (e.g., extended and/or retracted) to adjust an orientation or angle of the adjustable nozzle 316. The angle or orientation of the adjustable nozzle 316 will directionally direct the propellant from the nozzle assembly 312 to achieve a direction of movement as commanded by the control module 324. The power source 326 may be a battery, set of batteries, thermal power source (e.g., thermal battery), or the like, as will be appreciated by those of skill in the art.

The first linear electric actuator 318 may be configured to adjust the adjustable nozzle 316 in a first direction and the second linear electric actuator 320 may be configured to adjust the adjustable nozzle 316 in a second direction. The first direction may be normal to the second direction, resulting in adjustments to direction in three dimensions. That is, a configuration with two linear electric actuators 318, 320 provides for three degrees of freedom, resulting in the adjustable nozzle 316 to be pointed up, down, left, right, and thus achieve directional force application. The control module 324, through use of one or more processors and orientation information obtained from the sensors, will control the direction or angle of orientation of the adjustable nozzle 316 to provide a specific direction of motion. The direction or angle of orientation of the adjustable nozzle 316 may be set to first move the ejection seat 302 in a specific direction (e.g., up and to one side—to escape the aircraft 304), and then may be configured to adjust the direction or angle of orientation of the adjustable nozzle 316 to correct for roll that may be induced to the motion of the ejection seat 302 after the initial ejection from the aircraft 304.

In accordance with some embodiments of the present disclosure, the propellant assembly 306 may include replaceable parts, such as a replaceable propellant cartridge 308 and/or replaceable cartridge housing 310. In such configurations, the nozzle assembly 312 may be a permanent fixture of the ejection seat 302, allowing for reduced replacement costs associated with the ejection seat system 300. For example, in conventional configurations, that do not include such replaceable parts, the entire rocket catapult assembly may be required to be replaced (e.g., a mortar assembly, a breach, a catapult cartridge unit, a nozzle assembly, and a mortar cap assembly). That is, embodiments of the present disclosure reduce the number of replaceable parts within an ejection seat system.

Figure 4:
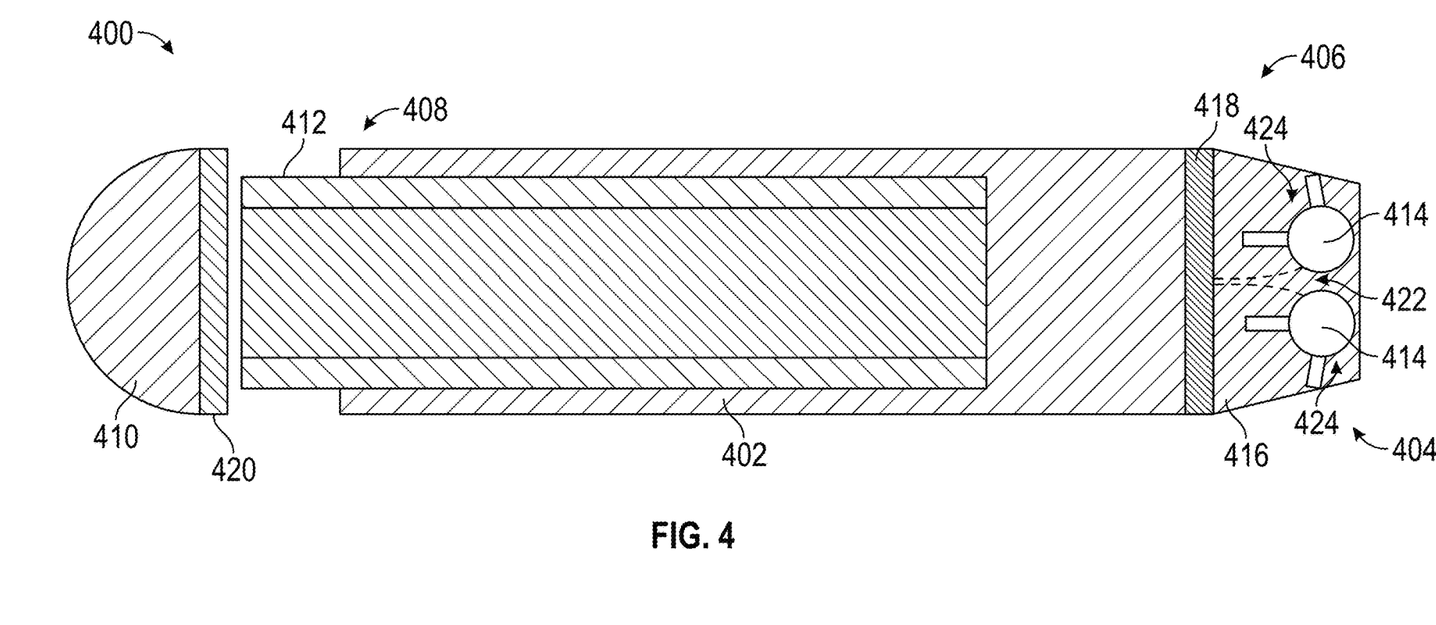
FIG. 4 is a schematic illustration of a propellant assembly for an ejection seat system in accordance with an embodiment of the present disclosure.

Referring now to FIG. 4, a schematic illustration of a propellant assembly 400 in accordance with an embodiment of the present disclosure is shown. The propellant assembly 400 may be used with the ejection seat system 300 of FIG. 3, the ejection seat system 200 of FIGS. 2A-2B, or with other ejection seat systems as will be appreciated by those of skill in the art. The propellant assembly 400 is configured as a cartridge assembly that is replaceable and includes a cartridge housing 402 that is removably attachable to a nozzle assembly 404 at a first end 406 of the cartridge housing 402. At a second end 408 of the cartridge housing 402 is a cartridge cap 410 which may removably attach to the cartridge housing 402. A propellant cartridge 412 is configured to be installed within the cartridge housing 402. The propellant cartridge 412 is formed of a solid propellant that may be ignited during an ejection operated to expel propellant through one or more adjustable nozzles 414 of the nozzle assembly 404.

At the first end 406 of the cartridge housing 402, the cartridge housing 402 may threadedly attach to a nozzle housing 416 of the nozzle assembly 404 at a first threaded connection 418. At the second end 408 of the cartridge housing 402, the cartridge housing 402 may threadedly attach to the cartridge cap 410 by a second threaded connection 420. When the cartridge housing 402 is installed to the nozzle assembly 404, a fluid connection 422 between the propellant cartridge 412 and the adjustable nozzles 414. As such, as the propellant of the propellant cartridge 412 is ignited, a motive force may be expelled through the adjustable nozzles 414. Each of the adjustable nozzles 414 are arranged to be adjusted by actuation of a respective linear electric actuator assembly 424. The linear electric actuator assemblies 424 may be similar to that described above with respect to FIG. 3.

As noted, the nozzle assembly 404 may be part of an ejection seat, and the cartridge housing 402, the cartridge cap 410, and/or the propellant cartridge 412 may be replaceable components of the system. In accordance with embodiments of the present disclosure, the cartridge housing 402 is configured to be installed within the ejection seat. In some configurations, the cartridge housing 402 may be a fixed portion of the ejection seat that is openable for installation of the propellant cartridge 412. For example, the cartridge housing 402 may be pivotably attached to the ejection seat so that it may extend rotate or pivot outward from a back of the ejection seat to allow access for installation or removal of the propellant cartridge 412. In other embodiments, the cartridge housing 402 may be completely removable and attachable to the ejection seat. Further, although described as threaded connection 418, 420, it will be appreciated that other types of connections may be employed at one or both ends of the cartridge housing 402. For example, and without limitation, lock-and-pin, bayonet-and-slot, clasps, releasable latches, and the like may be used to provide a releasable connection between the cartridge housing 402 and the other components without departing from the scope of the present disclosure.

Figure 5:
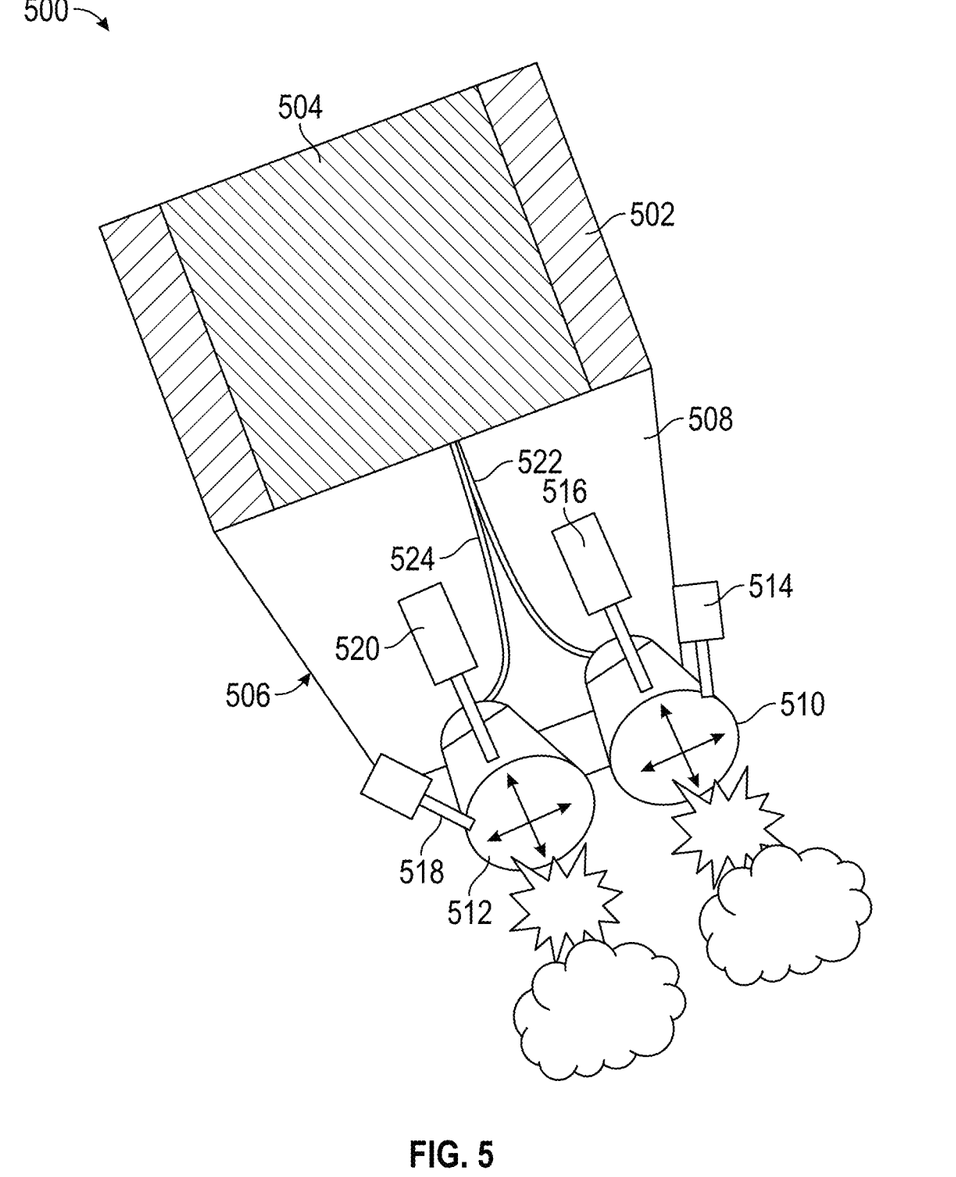
FIG. 5 is a schematic illustration of a portion of an ejection seat system in accordance with an embodiment of the present disclosure.

Referring now to FIG. 5, a schematic illustration of a portion of an ejection seat system 500 in accordance with an embodiment of the present disclosure is shown. As shown, a cartridge housing 502 contains a propellant cartridge 504 therein, with a nozzle assembly 506 attached at an end of the cartridge housing 502. The nozzle assembly 506 of this configuration includes nozzle housing 508 with a first adjustable nozzle 510 and a second adjustable nozzle 512 attached thereto. The first adjustable nozzle 510 is movable or adjustable relative to the nozzle housing 508 by operation of a respective first linear electric actuator 514 and a respective second linear electric actuator 516. Similarly, the second adjustable nozzle 512 is movable or adjustable relative to the nozzle housing 508 by operation of a respective first linear electric actuator 518 and a respective second linear electric actuator 520. That is, each adjustable nozzle 510, 512 is provided with at least two linear electric actuator that are configured to permit three degrees of freedom of motion for the respective adjustable nozzle 510, 512.

In this illustrative configuration, a first flow path 522 fluidly couples the propellant cartridge 504 to the first adjustable nozzle 510 and a second flow path 524 fluidly couples the propellant cartridge 504 to the second adjustable nozzle 512. As such, when the propellant of the propellant cartridge 504 is ignited during an ejection operation, exhaust through the respective adjustable nozzles 510, 512 may be directed to cause a change in direction of an ejection seat to which the ejection seat system 500 is a part. The directional orientation of the adjustable nozzles 510, 512 may be provided from a control module of the ejection seat system 500 (e.g., as shown in FIG. 3).

In accordance with embodiments of the present disclosure, when an ejection operation is initiated by a user, the propellant of the propellant cartridge is expelled and exhausted through one or more adjustable nozzles attached to the back of the ejection seat. Initially, as the ejection seat is separated from the breach and thus decoupled from an aircraft, the adjustable nozzle(s) maybe oriented to primarily direct the ejection seat upward and out of a cockpit or the like (e.g., +Y direction). Shortly thereafter, or simultaneously therewith, a lateral motion may be imparted to the ejection seat by adjusting the angle or orientation of the adjustable nozzle(s) (e.g., X direction). During the upward motion (+Y direction), the ejection seat may be tilted backward, resulting in a backward roll (e.g., +Z direction) and possibly the top portion of the ejection seat rotating in a downward roll (e.g., -Y direction). Additionally, when a lateral motion is imparted through the adjustable nozzles, a roll may be induced. However, the lateral motion may be necessary to ensure that the occupant of the ejection seat does not collide with debris, parts of the aircraft, another ejection seat, or the like. The lateral motion is induced by actuating the linear electric actuators to point the nozzle(s) in a commanded direction to ensure the ejection seat moves in the intended directions. As the ejection seat is ejected, the directional forces from the adjustable nozzles may cause a roll to be imparted in the ejection seat.

In accordance with embodiments of the present disclosure, as the roll is induced, sensors of a control module may detect the roll (e.g., accelerometers) and provide commands or power to the linear electric actuator(s), which will cause adjustment of the angle or direction of exhaust of propellant through the respective adjustable nozzle. Because the adjustable nozzle may be oriented by actuation of one or more linear electric actuators, the adjustable nozzle(s) provide for thrust vectoring, and thus controlled movement of the ejection seat during the ejection operation. As the control module receives data from the sensors, the control module is configured to control actuation of one or more of the linear electric actuators of a given adjustable nozzle to cause a change in direction.

Figure 6:
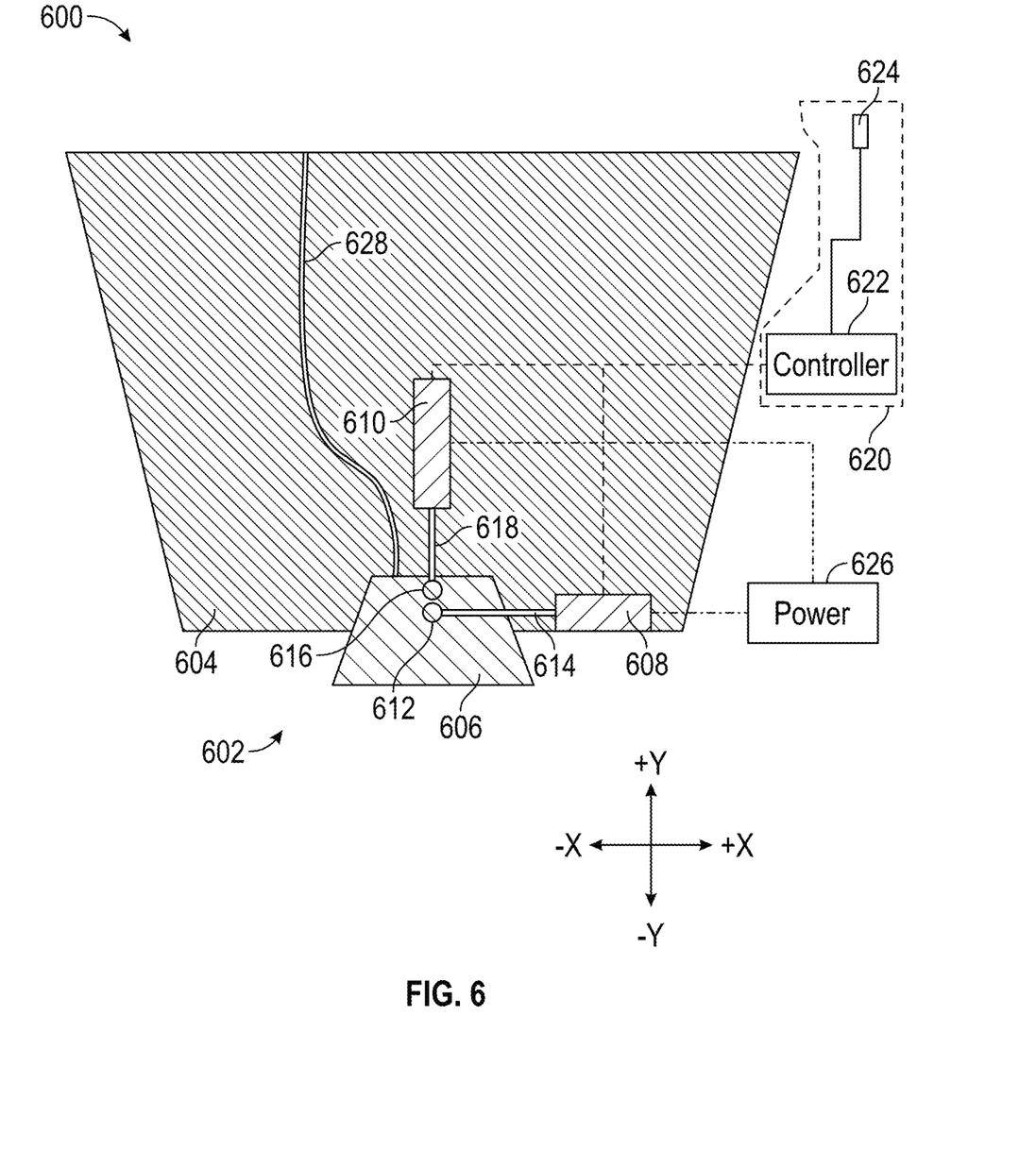
FIG. 6 is a schematic illustration of a portion of an ejection seat system in accordance with another embodiment of the present disclosure.

Referring now to FIG. 6, a schematic illustration of a portion of an ejection seat system 600 in accordance with an embodiment of the present disclosure is shown. The ejection seat system 600 may be mounted to an ejection seat, such as shown and described above. In the illustration of FIG. 6, only a nozzle assembly 602 is shown for simplicity. The nozzle assembly 602 includes a nozzle housing 604 with an adjustable nozzle 606 movably mounted or attached thereto. The adjustable nozzle 606 is pivotable relative to the nozzle housing 604 by actuation of a first linear electric actuator 608 and a second linear electric actuator 610. The first linear electric actuator 608 is configured to adjust the adjustable nozzle 606 in a first direction (e.g., the X-direction (positive or negative)) and the second linear electric actuator 610 is configured to adjust the adjustable nozzle 606 in a second direction (e.g., the Y-direction (positive or negative)). The first direction may be normal or perpendicular to the second direction, although such normal orientation is not required, as long as the two linear electric actuators provide for a component of motion in the respective first and second directions. In this illustrative configuration, the first linear electric actuator 608 connects to the adjustable nozzle 606 at a first pivot connection 612 through a first piston 614. Similarly, the second linear electric actuator 610 connects to the adjustable nozzle 606 at a second pivot connection 616 through a second piston 618.

A control module 620 is operably connected to each of the first and second linear electric actuators 608, 610 to cause operation or actuation thereof. In this illustrative configuration, the control module 620 includes a controller 622 and one or more sensors 624. The controller 622 may include various electronic components, such as processor(s), memory, input/output interfaces, and the like, as will be appreciated by those of skill in the art. The sensors 624 may be accelerometers or the like, which are configured to detect orientation of an ejection seat in which the sensors 624 are located. In some configurations, each of the first and second linear electric actuators 608, 610 may include encoders or the like to provide feedback information to the controller 622 so that the controller 622 can ensure proper operation thereof. The first and second linear electric actuators 608, 610 may be supplied with electrical power from a power source 626, such as a battery or the like. In some embodiments, the power source 626 may be a dedicated power source for the operation of the first and second linear electric actuators 608, 610. In other configurations, the power source 626 may be configured to supply power to the control module 620 and components thereof. In configurations that employ a dedicated, single purpose power source for the actuators, the ejection seat system may include a second power source that is part of the control module 620.

During an ejection operation, propellant will be exhausted through a propellent line or fluid connection 628 that connects a propellant cartridge which supplied propellant through the fluid connection 628. As exhaust is expelled through the adjustable nozzle 606, the orientation or direction that the adjustable nozzle 606 is pointing may change due to the force of the exhaust. The first and second linear electric actuators 608, 610 may provide a locking force to ensure that the adjustable nozzle 606 does not change direction unless commanded to do so by the control module 620. For example, in response to a detection by the sensors 624 that the ejection seat is oriented in an improper direction (absolute direction) or subject to a roll motion (transient changing direction), the controller 622 may cause one or both of the first and second linear electric actuators 608, 610 to actuate and cause the adjustable nozzle 606 to change orientation or direction relative to the ejection seat, thus causing a change in direction of motion thereof.

In some embodiments, the controller 622 may be pre-programmed with a specific set of control operations. That is, the controller 622 or the control module of the ejection seat systems described herein, may be pre-programmed with a thrust vectoring operation to be performed in response to the initiation of an ejection operation. As such, when the ejection operation is initiated by a pilot, crewmember, or user, the ejection seat may be ejected from an aircraft and moved in a preset manner to avoid other ejection seats, the aircraft, or the like. For example, the controller 622 may be programmed to cause the ejection seat to clear an aircraft and shift position (e.g., lateral movement) in order to avoid collision with anything else. As such, in one non-limiting example, in a two-seat aircraft, a forward seat may be configured with a controller programmed to eject the ejection seat upward and out of the aircraft and impart a lateral movement to the left (relative to the forward direction of the aircraft) and a rear seat may be configured with a controller programmed to eject the ejection seat upward and out of the aircraft and impart a lateral movement to the right. As such, the two seat will avoid collision with the aircraft and with each other.

As the seats are ejected, and moved laterally, the exhaust from the adjustable nozzle 606 may cause a roll in motion. To correct for this roll, the controller 622 may cause one or both of the first and second linear electric actuators 608, 610 to be actuated and change the direction of exhaust out of the adjustable nozzle 606. This adjustment may be provided to counteract a detected roll that is measured at the sensors 624. Because the adjustable nozzle 606 is provided with the first and second linear electric actuators 608, 610, adjustments may be made in three degrees of movement, allowing for correction of detected roll. Further, in some embodiments, such as shown in FIG. 5, the system may be provided with two or more adjustable nozzles. Incorporation of additional nozzles may provide for increased control and/or response to detected rolls and to provide additional thrust vectoring.

Advantageously, in accordance with embodiments of the present disclosure, improved ejection seat systems are provided. In accordance with some embodiments, thrust vectoring and controlled motion of an ejection seat is provided from a nozzle assembly having one or more adjustable nozzles, with each adjustable nozzle having two or more linear electric actuators operably connected thereto. In some embodiments, the two adjustable nozzles maybe adjustable to control movement in at least two directions that are normal to each other. In some configurations, the two linear electric actuators may be arranged normal to each other, such that one may apply force in the ±X direction and the other may apply force in the ±Y direction. In some such embodiments, both adjustable nozzles may apply force in the Z direction, with the actuations of the linear electric actuators to control movement and correct for roll in each of the X, Y, and Z directions.

Advantageously, embodiments of the present disclosure provide for improved ejection seat systems, which may reduce the number of components, reduce weight, increase safely, and make serviceability easier as compared to prior ejection seat system configurations. For example, the ejection seat systems of the present disclosure may enable removal or elimination of the TDRM and vernier motors, while still allowing the ejection seat to be moved laterally (e.g., diverging seats from one another) and can also correct roll that is induced during such a lateral movement operation. Embodiments of the present disclosure may ensure proper orientation of ejection seat, thus enhancing overall safety to an occupant of the ejection seat. Furthermore, embodiments of the present disclosure can allow infinite corrections to the ejection seat during the ejection operation, because the adjustable nozzles are actively controlled and adjusted in response to sensor detections and control commands from a control module. This is in contrast to conventional vernier motors. A vernier motor may itself be adjustable in direction, but this is the entire motor, and thus provides limited directional control. In contrast, embodiments of the present disclosure incorporate adjustable nozzles that are movable by actuation of linear electric actuators, as shown and described above. That is, rather than adjusting the entire nozzle assembly (e.g., nozzle housing and attached nozzle(s)), embodiments of the present disclosure are directed to adjustable nozzles that are pivotably mounted or attached to a nozzle housing, and thus fine tuning of direction/orientation and thrust vectoring is possible.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An ejection seat system comprising:
    an ejection seat;
    a propellant assembly mounted to the ejection seat;
    a nozzle assembly comprising an adjustable nozzle moveably attached to the ejection seat and configured to receive propellant exhaust from the propellant assembly and exhaust through the adjustable nozzle;
    a first linear electric actuator operably connected to the adjustable nozzle and arranged to adjust an orientation of the adjustable nozzle in a first direction;
    a second linear electric actuator operably connected to the adjustable nozzle and arranged to adjust an orientation of the adjustable nozzle in a second direction, wherein the second direction comprises a directional component that is normal to the first direction; and
    a control module configured to control operation of the first linear electric actuator and the second linear electric actuator.

2. The ejection seat system of claim 1, further comprising at least one sensor arranged on the ejection seat and configured to detect a directional orientation of the ejection seat, wherein the at least one sensor is operably connected to the control module.

3. The ejection seat system of claim 1, wherein the control module comprises a controller and at least one sensor configured to detect a directional orientation of the ejection seat, wherein the at least one sensor is operably connected to the controller.

4. The ejection seat system of claim 1, further comprising a power source configured to supply electrical power to each of the first linear electric actuator and the second linear electric actuator.

5. The ejection seat system of claim 4, wherein the power source is a battery installed within the ejection seat.

6. The ejection seat system of claim 4, wherein the power source is configured to supply power to the control module.

7. The ejection seat system of claim 1, wherein the propellant assembly comprises:
    a cartridge housing configured to be attached to the ejection seat; and
    a propellant cartridge installed within the cartridge housing.

8. The ejection seat system of claim 7, wherein the nozzle assembly is configured to removably attach to the cartridge housing at a first end of the cartridge housing.

9. The ejection seat system of claim 8, wherein the propellant assembly further comprises a cartridge cap removably attachable to a second end of the cartridge housing.

10. The ejection seat system of claim 7, wherein the propellant cartridge comprises a solid propellant.

11. The ejection seat system of claim 1, further comprising a breach configured to releasably connect the ejection seat to an aircraft.

12. The ejection seat system of claim 1, wherein the adjustable nozzle is a first adjustable nozzle and the nozzle assembly comprises a second adjustable nozzle.

13. The ejection seat system of claim 12, further comprising a second first linear electric actuator operably connected to the second adjustable nozzle and a second second linear electric actuator operably connected to the second adjustable nozzle.

14. The ejection seat system of claim 1, wherein the control module is configured to perform thrust vectoring based on input received from at least one sensor.

15. A method of ejecting an ejection seat from an aircraft, the method comprising:
    initiating an ejection operation in response to an ejection operation input;
    igniting a propellant of a propellant assembly that is mounted to an ejection seat;
    directing propellant exhaust through a nozzle assembly that is operably connected to the propellant assembly, wherein the nozzle assembly comprises an adjustable nozzle;
    monitoring an orientation of the ejection seat using at least one sensor and a control module; and
    controlling, using the control module, operation of a first linear electric actuator and a second linear electric actuator to adjust a direction of the adjustable nozzle in response to the monitored orientation of the ejection seat, wherein the first linear electric actuator is arranged to adjust an orientation of the adjustable nozzle in a first direction and the second linear electric actuator is arranged to adjust an orientation of the adjustable nozzle in a second direction, wherein the second direction comprises a directional component that is normal to the first direction.

16. The method of claim 15, wherein the control module and at least one sensor are configured to monitor for a roll of the ejection seat and to adjust the orientation of at least one of the first linear electric actuator and the second linear electric actuator to correct for a detected roll.

17. The method of claim 15, further comprising supplying electrical power from a power source mounted on the ejection seat to each of the first linear electric actuator and the second linear electric actuator.

18. The method of claim 15, wherein the control module is configured with a pre-programmed thrust vectoring operation to be performed in response to the initiation of the ejection operation.

19. The method of claim 18, wherein the control module is configured to adjust the pre-programmed thrust vectoring operation in response to input received from the at least one sensor by controlling actuation of the first linear electric actuator and the second linear electric actuator.

20. The method of claim 15, wherein the adjustable nozzle is a first adjustable nozzle and the nozzle assembly comprises a second adjustable nozzle, the method further comprising:
    controlling, with the control module, thrust vectoring of each of the first adjustable nozzle and the second adjustable nozzle.

* * * * *